United States Patent [19]

Simioni

[11] Patent Number: 5,596,789
[45] Date of Patent: Jan. 28, 1997

[54] HINGE FOR EYEGLASSES

[75] Inventor: Luciano Simioni, Montebelluna, Italy

[73] Assignee: Killer Loop S.p.A., Pederobba, Italy

[21] Appl. No.: 352,037

[22] Filed: Nov. 30, 1994

[30] Foreign Application Priority Data

Dec. 3, 1993 [IT] Italy ................. TV93A0108

[51] Int. Cl.$^6$ ................................... G02C 5/22
[52] U.S. Cl. ............... 16/228; 16/224; 351/153; 403/135; 403/122; 403/52
[58] Field of Search ............. 16/228, 224; 351/153; 403/135, 143, 122, 52

[56] References Cited

U.S. PATENT DOCUMENTS

| | | | |
|---|---|---|---|
| 1,970,196 | 8/1934 | Rodemeyer | 351/153 |
| 2,537,248 | 1/1951 | Vigano | 351/153 |
| 2,612,139 | 9/1952 | Collins | 403/122 |
| 3,476,466 | 11/1969 | Hopkins | 16/224 |
| 3,714,678 | 2/1973 | Weisz et al. | 16/224 |
| 3,853,414 | 12/1974 | Hirano et al. | 403/122 |
| 5,418,581 | 5/1995 | Conway | 351/153 |

FOREIGN PATENT DOCUMENTS

| | | |
|---|---|---|
| 0067110 | 12/1982 | European Pat. Off. . |
| 0207190 | 1/1987 | European Pat. Off. . |
| 2221746 | 10/1974 | France . |
| 2354028 | 12/1977 | France . |
| 2906516 | 8/1980 | Germany . |

*Primary Examiner*—Chuck Y. Mah
*Attorney, Agent, or Firm*—Guido Modiano; Albert Josif

[57] ABSTRACT

The hinge for eyeglasses, of the type including a lens-bearing front having two temples hinged thereto, has a shaped element and a support. The shaped element has a protruding tab defining an L-shaped base which can be detachably accommodated in a complementarily-shaped first seat formed in the end portion of a temple. The shaped element is detachably accommodated in a second seat formed in the support. Elastically deformable engagement members are connected to the support, for detachably connecting the support to a complementarily shaped third seat formed in a front.

16 Claims, 7 Drawing Sheets

HINGE FOR EYEGLASSES

BACKGROUND OF THE INVENTION

The present invention relates to a hinge for eyeglasses.

Eyeglasses are currently constituted by a front that supports a single lens or a pair of lenses;. hinges for connection to temples are associated with the ends of said front.

It is accordingly known to manufacture hinges that are constituted by two elements that are mutually rotatably associated and have free ends that can be embedded, for example, in the temple and in the front or are directly obtained or formed at the ends of said temples and said front.

The use of these conventional hinges entails drawbacks: first of all it is necessary to pre-assemble the two parts that constitute the hinge to the front and to the temple and then rotationally connect said parts.

Furthermore, if the temple is damaged, it cannot be easily replaced, since the user must have particular tools, such as a screwdriver with a very narrow tip.

The use of these conventional hinges furthermore forces the temples to close by swinging with respect to the front, with the drawback that they increase the bulk of the pair of eyeglasses when not in use, entailing difficulty in storage by the user.

Finally, it is noted that in case of accidental impacts of the front or the temple, these impacts are transmitted to the entire pair of eyeglasses, with consequent possible damage to the user not only in the part affected by the impact but also in the remaining portion of the pair of eyeglasses rigidly connected to it.

SUMMARY OF THE INVENTION

A principal aim of the present invention is therefore to solve the described technical problems, eliminating the drawbacks of the prior art and thus providing a hinge that allows to rapidly and simply assemble it to the remaining parts that constitute the pair of eyeglasses in order to allow better industrialization.

Within the scope of this aim, an important object is to provide a hinge that allows easy and quick interchangeability of the individual components of the pair of eyeglasses without using particular tools.

Another object is to provide a hinge that allows to limit the overall space occupied by the various parts of the pair of eyeglasses when not in use, particularly for highly curved lens shapes.

Another important object is to provide a hinge that can be applied to a pair of eyeglasses, the remaining parts of which can equally be made of either plastics or metal.

Another object is to provide a hinge that is structurally simple.

Another object is to provide a hinge that associates with the preceding characteristics, that of being reliable and safe in use and has low manufacturing costs.

With the foregoing and other objects in view, there is provided a hinge for eyeglasses which include a temple and a front, characterized in that it comprises at least one spherical or cylindrical or polyhedral element which is associated or detachably associable with said temple and with a lens or with a support, which in turn is associated, or detachably associable, with said front or with part of it or with said lens.

BRIEF DESCRIPTION OF THE DRAWINGS

Further characteristics and advantages of the invention will become apparent from the detailed description of some particular but not exclusive embodiments, illustrated only by way of non-limitative example in the accompanying drawings, wherein.

DESCRIPTION OF THE PREFERRED EMBODIMENTS

With reference to the above figures, the reference numeral 1 designates the hinge for eyeglasses 2 which comprise pivotally interconnected members including temples 3 and a front portion having a single lens or two lenses 4.

Figure 2:
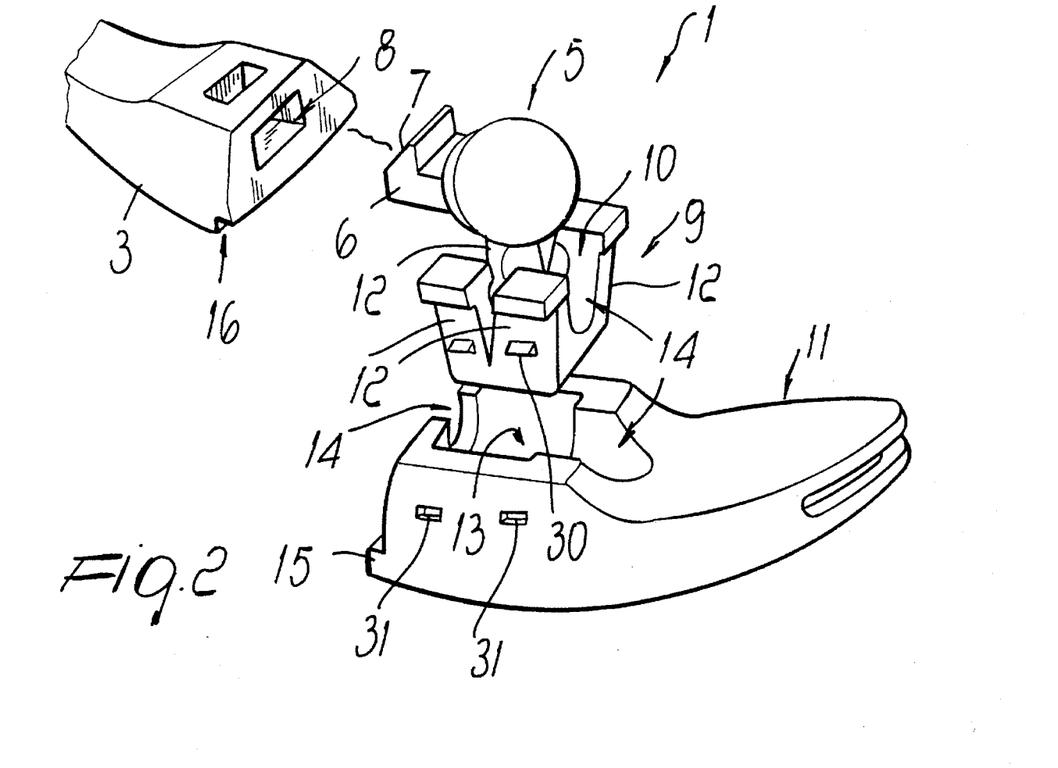
FIG. 2 is an exploded view of the hinge, of a temple, of the support, and of part of the front.

The hinge 1 is constituted by at least one shaped element, i.e., a spherical element 5 which has means for detachable connection to the temples; said means are constituted by at least one tab 6, which is essentially T-shaped or L-shaped, has a base 7 whose thickness tapers so as to form a wedge-like element, and is detachably associable at a complementarily shaped first seat 8 formed at one end of the temple 3.

The spherical element 5 is in turn detachably associable with a support 9 which has a suitable second seat 10 that is shaped complementarily to said spherical element.

The support 9 is in turn detachably associable at a front 11 and has temporary engagement means which are constituted by four arms 12 that can be compressed elastically and allow the snap-together insertion of said support 9 within a complementarily shaped third seat 13 formed at one end of said front 11.

Figure 3:
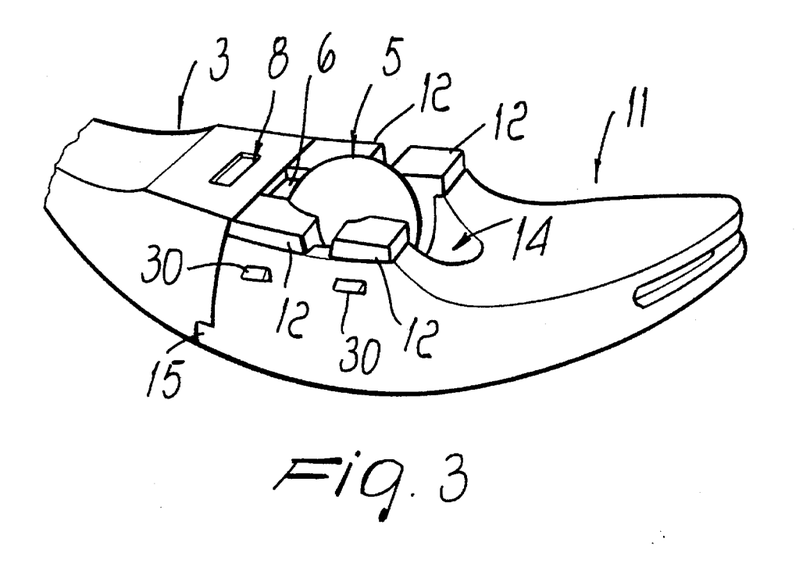
FIG. 3 is a lateral perspective view of the assembled hinge in the condition in which the temple is open.
Figure 4:
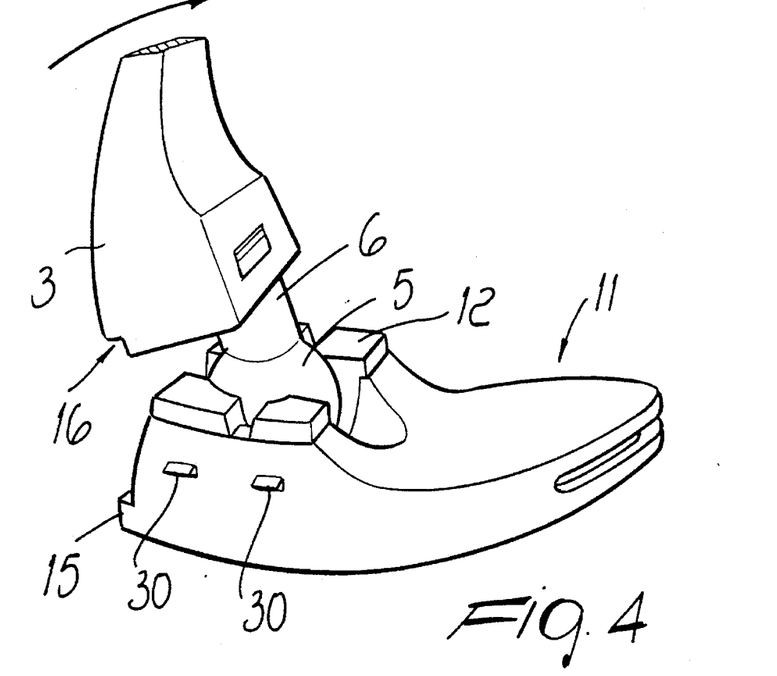
FIG. 4 is a view of a first step of the closure of the temple.
Figure 6:
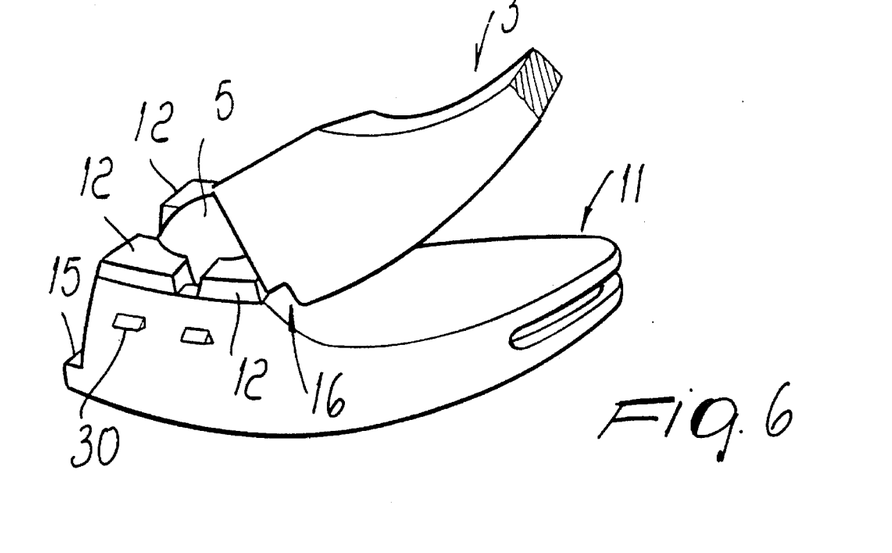
FIG. 6 is a view of a third step of the closure of the temple.

Both the support 9 and the front 11 have, at the axis of the tab 6 that protrudes from the spherical element 5, a pair of grooves, designated by the reference numeral 14, that allow to correctly place the temple 3 in the closed and open conditions, as shown in FIGS. 3 and 6.

As an alternative, the connection between the support 9 and the front 11 can occur in a snap-together manner, by virtue of suitable engagement and securing means constituted by wings 30 which protrude from the arms 12 and are detachably associable at complementarily shaped openings 31 which are formed laterally with respect to the support 9 and are connected to the third seat 13.

Figure 1:
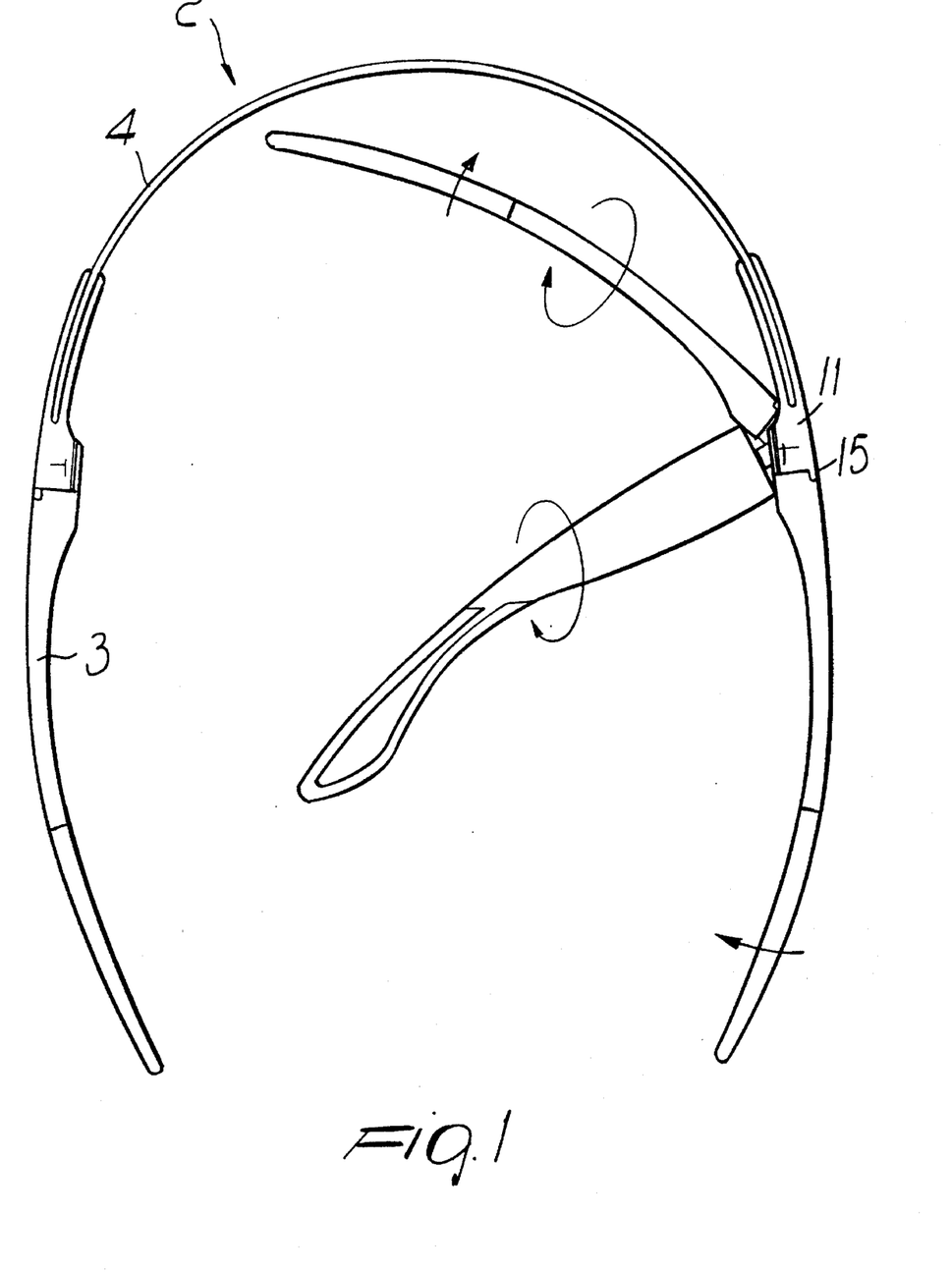
FIG. 1 is a bottom view of a pair of eyeglasses to which the hinge has been applied, illustrating the movements that can be imparted to a temple.

Means for preventing the excessive opening of the temple 3 beyond the active position shown in FIG. 1 are furthermore provided and are constituted by a first tooth 15 which protrudes transversely at the end of the front 11 located away from the lens 4 and can abut at a complementarily shaped recess 16, which is formed transversely at the end of the temple 3.

Figure 5:
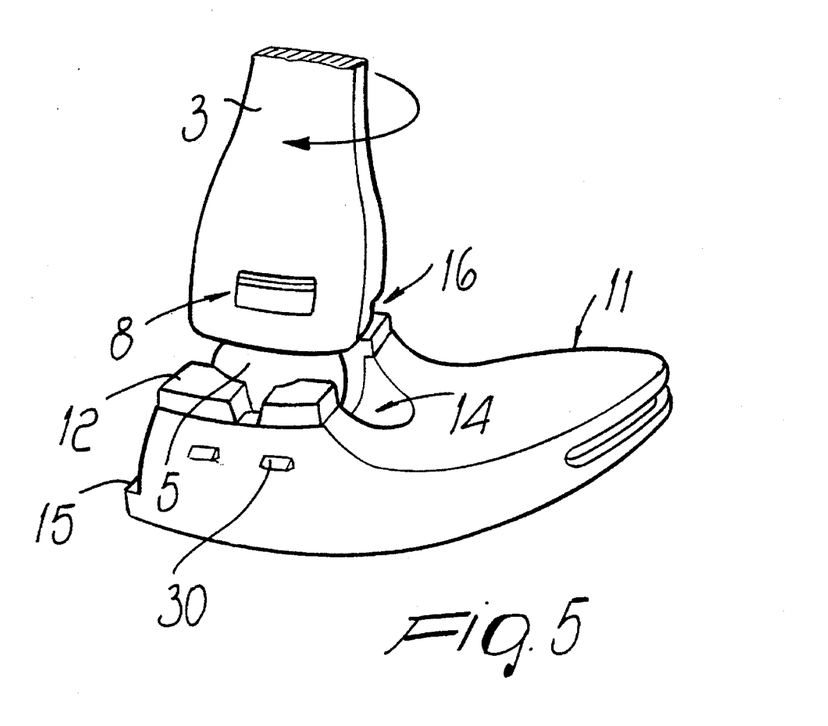
FIG. 5 is a view of a second step of the closure of the temple.
Figure 7:
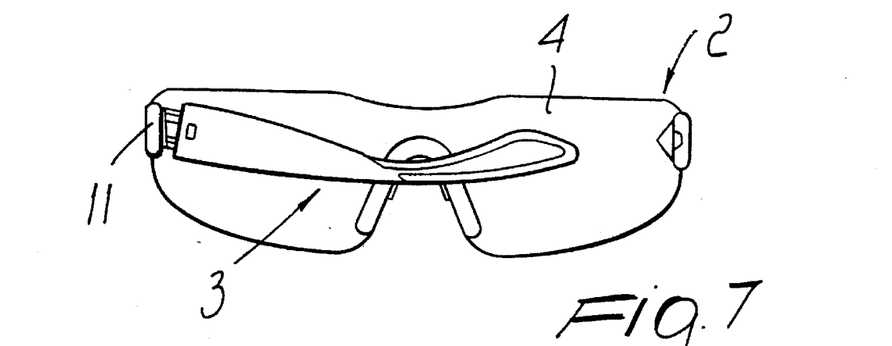
FIG. 7 is a rear view of a pair of eyeglasses in which the temple has been closed and then rotated with respect to normal use.
Figure 8:
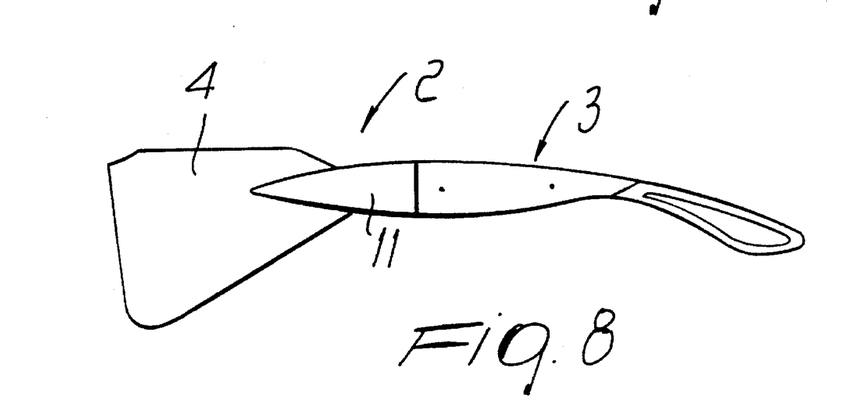
FIG. 8 is a side view of a pair of eyeglasses in which the temple is open.

This shape allows, starting from the fully open condition shown in FIG. 3, in which the temple is fully open, to first rotate said temple about a single axis through 90° with respect to the plane of the front 11 into the free rotation condition of the temple and then, as shown in FIGS. 5 and 6, to rotate said temple through 180° with respect to a plane that lies approximately parallel to the front 11, and then to fold the temple towards said front into a completely closed condition 11 so as to allow, as shown in FIGS. 1 and 7, optimum storage of said temple to put the pair of eyeglasses away easily.

It will be appreciated that elastic deformation of the components of the various embodiments of the hinge described herein, permits interconnection of the various components of the hinge e.g., insertion of the tab 6 into the first seat 8, insertion of the shaped element 5 into the second seat 10, and insertion of the support 9 into the third seat 13.

It has thus been observed that the invention has achieved the intended aim and objects, since the hinge is structurally very simple and therefore can be correctly and quickly assembled to the various components of the pair of eyeglasses even without having particular tools available.

This hinge also allows to couple different materials, and it is furthermore possible to store the pair of eyeglasses in compact containers when the temple is closed.

Figure 9:
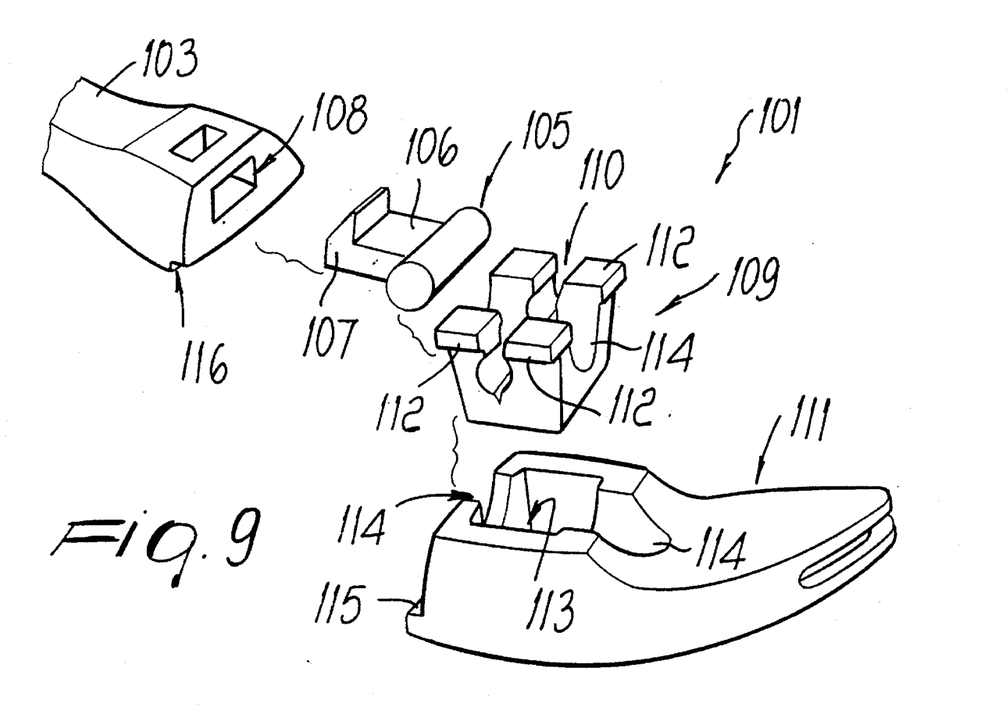
FIGS. 9, 10, 11, and 12 are views, similar to FIG. 2, of other embodiments of the hinge, including the possibility of allowing the support to rotate.
Figure 10:
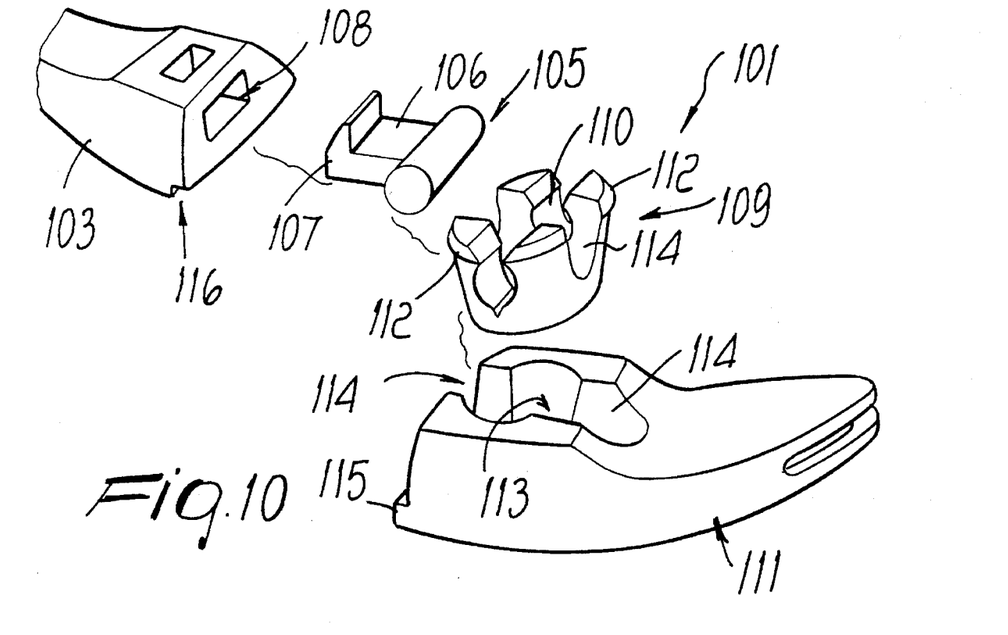

FIGS. 9 and 10 illustrate two further embodiments of the hinge 101 which is constituted by at least one cylindrical element 105 from which at least one tab 106 protrudes along a generatrix: said tab is essentially T-shaped or L-shaped, and the thickness of its base 107 tapers to form a wedge-like element; said tab is detachably associable at a suitable and complementarily shaped first seat 108 formed at one end of the temple 103.

The cylindrical element 105 is in turn detachably associable with a support 109 which is essentially shaped like a truncated pyramid or a cylinder and has a second seat 110 which is shaped complementarily to said cylindrical element 105 and allows to temporarily connect it and to rotate it.

The support 109 is in turn detachably associable at a front 111 and has temporary engagement means which are constituted by four arms 112 that can be compressed elastically and allow the snap-together insertion of said support 109 within a suitable complementarily shaped third seat 113 which is formed at one end of said front 111.

Both the support 109 and the front 111 have, at the axis of the tab 106 that protrudes from the cylindrical element 105, a pair of grooves, designated by the reference numeral 114, to allow the correct positioning of the temple 103 in the closed and open conditions.

These solutions, too, include means that prevent the excessive opening of the temple 103 beyond its active position; said means are constituted by a first tooth 115 that protrudes transversely at the end of the front 111 located away from the lens and can abut at a complementarily shaped recess 116 formed transversely with respect to the end of the temple 103.

This shape allows, starting from the condition in which the temple is open, to rotate said temple through 90° with respect to the plane of the front 111 in order to place it adjacent to the lens and allow the support to rotate freely.

Figure 11:
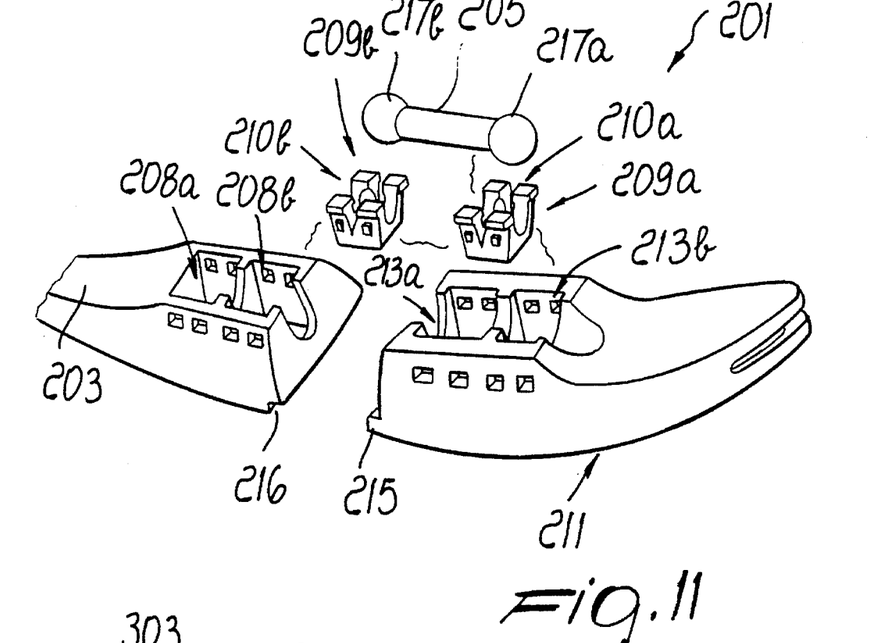

FIG. 11 illustrates another embodiment of the hinge 201, constituted by at least one connecting element 205 which is preferably cylindrical; two spherical elements 217a and 217b are rigidly coupled with the ends of said connecting element and are detachably associable with a first support 209a and with a second support 209b, which are essentially shaped like a truncated pyramid or a cylinder; said first and second supports have a second seat 210a and 210b which is shaped complementarily with respect to said spherical element 217b and allows its temporary connection, optionally in a snap-together manner.

The second support 209b can in turn be detachably located at complementarily shaped first seats 208a and 208b which are formed at one end of the temple 203; said first seats are arranged sequentially with respect to each other to allow the desired arrangement of said first support.

The second support 209a is in turn detachably associable at suitable and complementarily shaped third seats 213a and 213b formed at one end of the front 211.

Both the first support and the second support have temporary engagement means which are constituted by four elastically compressible arms which allow the snap-together insertion of said first and second supports within said third seats.

The supports 209a and 209b, the front 211, and the temple 203 have, at the axis of the cylindrical element 205, grooves to allow the passage of said cylindrical element.

Also in these solutions there are means to prevent the excessive opening of the temple 203 beyond its active position; said means are constituted by a first tooth 215 which protrudes transversely from the end of the front 211 located away from the lens and can abut at a complementarily shaped recess 216 formed transversely at the end of the temple 203.

Figure 12:
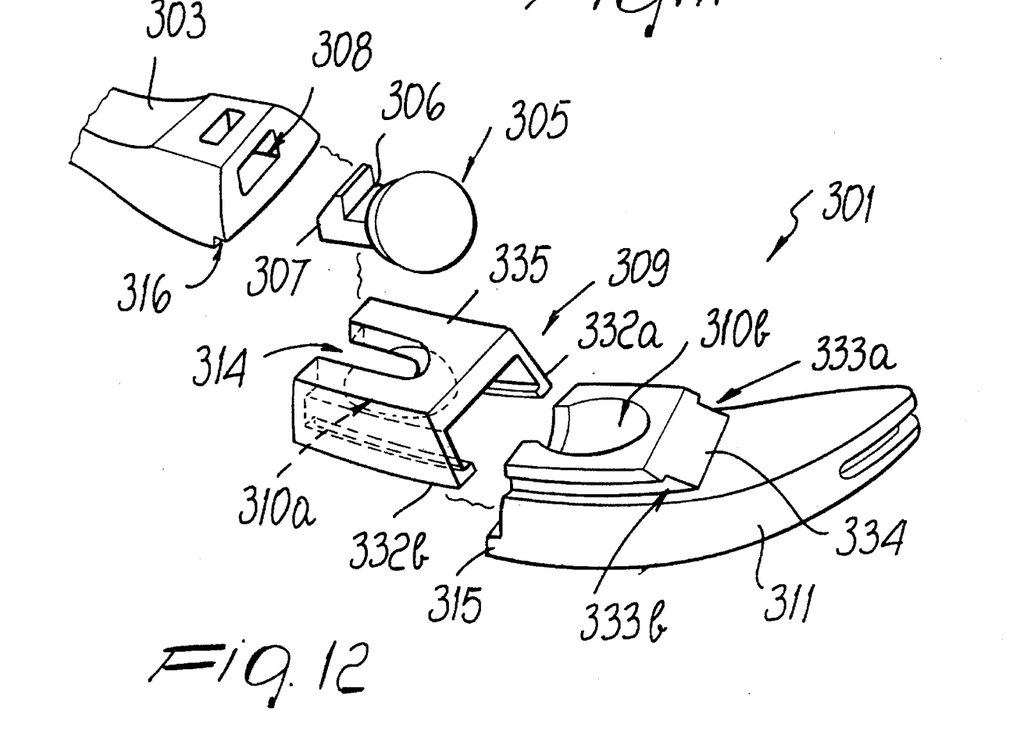

FIG. 12 illustrates a further embodiment of the hinge 301 which is constituted by at least one spherical element 305 from which at least one tab 306 protrudes radially along a generatrix; said tab is essentially T-shaped or L-shaped, and the thickness of its base 307 tapers to form a wedge-like element; said tab is detachably associable at a complementarily shaped first seat 308 which is formed at one end of the temple 303.

The spherical element 305 is in turn detachably associable with a support 309 which is essentially C-shaped and has wings 332a and 332b that can be slidingly associated at complementarily shaped guides 333a and 333b formed laterally with respect to a protrusion 334 that extends from the front 311, as shown in FIG. 12.

The support 309 has, at the surface of the base 335 that joins the wings 332a and 332b and is directed towards the protrusion 334, a second seat 310a that accommodates said spherical element 305 together with an additional seat 310b which is formed on said protrusion.

The support 309 is thus detachably associable at the front 311.

The protrusion 334 furthermore has a groove 314 at the axis of the tab 306 that protrudes from the cylindrical element 305.

Means are also provided to prevent excessive opening of the temple 303 beyond its active position; said means are constituted by a first tooth 315 that protrudes transversely at the end of the front 311 located away from the lens and can abut at a complementarily shaped recess 316 formed transversely at the end of the temple 303.

Figure 13:
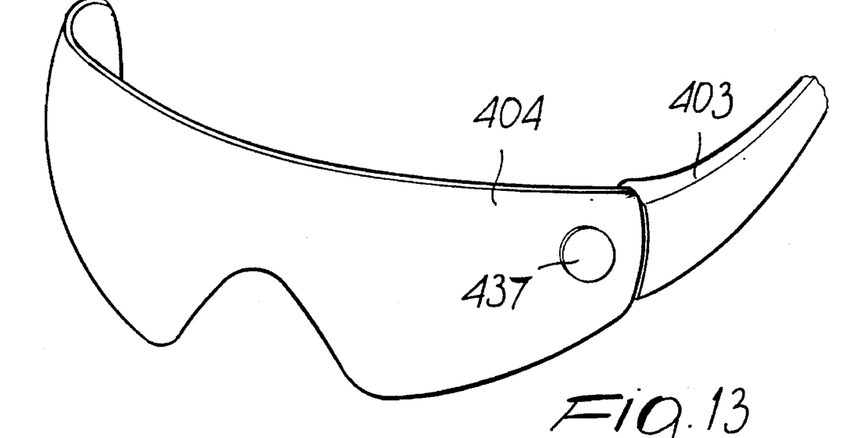
FIG. 13 is a lateral perspective view of a pair of eyeglasses.
Figure 14:
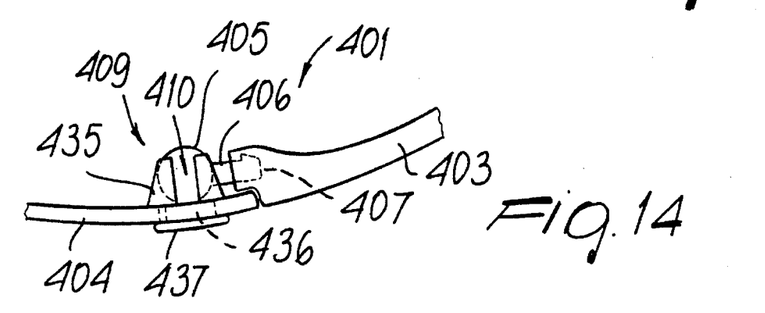
FIG. 14 is a detail view of the direct connection of the support on the lens.

FIGS. 13 and 14 illustrate another embodiment of the hinge 401 which is constituted by at least one spherical element 405, from which at least one tab 406 protrudes radially along a generatrix; said tab is essentially T-shaped or L-shaped, and the thickness of its base 407 tapers to form a wedge-like element; said tab is detachably associable at a complementarily shaped first seat formed at one end of the temple 403.

The spherical element 405 is in turn detachably associable with a support 409 which is essentially T-shaped: its stem 435 is shaped like a truncated cone or a cylinder and has arms 412 that are flexible to allow their snap-together insertion within a suitable hole 436 formed at one end of the lens 404 so as to optionally allow the support 409 to rotate.

The stem 435 of the support 409 in fact has a second seat 410 which is shaped complementarily to said cylindrical element 405 and allows its temporary connection.

The connection of the support 409 to the lens 404 is allowed by the abutting interaction of the head 437 and the stem 435 of said support with said lens.

Figures 15, 16:
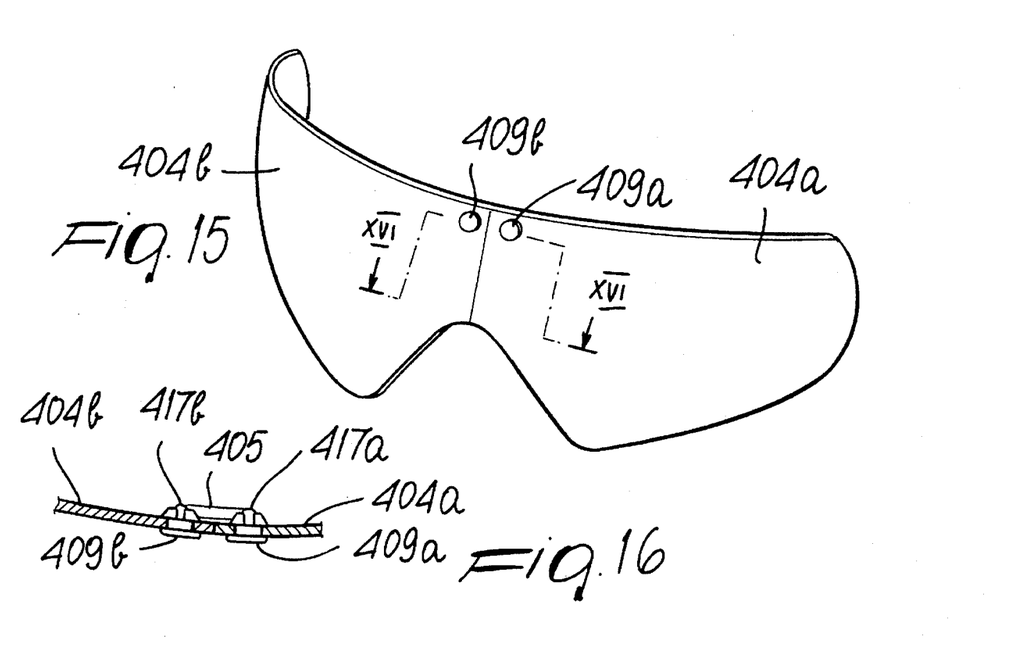
FIG. 15 is a perspective view of a pair of eyeglasses, wherein the invention is used to Connect two lenses to allow to fold the front.
FIG. 16 is a sectional view, taken along the plane XVI—XVI of FIG. 15.

As shown in FIGS. 15 and 16, it is possible to use two supports 409a and 409b which are respectively detachably associated at a lens 404a and 404b and are mutually joined by means of a cylindrical element 405; two spherical elements 417a and 417b are rigidly coupled to the ends of said cylindrical element and are detachably associable with said two supports 409a and 409b.

An optimum temporary connection between the lenses of a frame is thus obtained, allowing to rapidly replace said lenses and to perform a rotation that arranges them approximately on a same plane for easy storage.

The materials and the dimensions that constitute the individual components of the structure may naturally be the most pertinent according to the specific requirements.

What is claimed is:

1. In a pair of eyeglasses comprising a first portion and a second portion, a hinge for mutually pivotally connecting the first portion and the second portion, the hinge comprising:

a shaped element with a substantially spherical shape provided at one of said first and second portions; and a support seat provided at the other of said first and second portions;

wherein said first portion is a temple element having a longitudinal extension axis; and wherein said shaped element is rotatably supported in said support seat such that, in a free rotation condition between said temple element and said second portion, said temple element is rotatable with respect to said second portion about at least two rotation axes all passing substantially through a central point of said spherical shaped element, one of said two rotation axes corresponding substantially to said longitudinal extension axis of the temple element; and wherein the hinge further comprises means for substantially allowing rotation of said temple element with respect to said second portion when said temple element and said second portion are in a substantially fully open condition only about a single axis so as to rotate the temple element with respect to the second portion about said single axis to move said temple from said fully open condition into said free rotation condition between said temple element and said second portion.

2. The combination of claim 1 wherein said single axis extends substantially perpendicularly to said longitudinal extension axis of said temple element.

3. The combination of claim 1 wherein said second portion is a lens front portion.

4. The combination of claim 3 wherein said lens front portion is curved and wherein said temple element is curved, and wherein in said substantially fully open condition both said lens front portion and said temple element are both curved convexly inwardly, and wherein in a completely closed condition in which said temple element extends adjacent said lens front portion, said lens front portion and said temple element are both curved convexly inwardly.

5. The combination of claim 1 wherein said shaped element has a tab protruding therefrom.

6. The combination of claim 5 further comprising means for detachably connecting said tab to said one of said first and second portions.

7. The combination of claim 5 wherein said support seat is provided with a pair of oppositely arranged grooves for accommodating said tab.

8. The combination of claim 1 wherein said support seat is provided in a support element, and wherein the combination further comprises means for detachably connected said support element to said other of said first and second portions.

9. The combination of claim 8 wherein said support element is provided with a plurality of elastically compressible arms surrounding said support seat.

10. The combination of claim 8 said support seat further comprises a plurality of seats in which said support element is selectively accommodated.

11. The combination of claim 1 wherein said means for substantially allowing rotation of said temple element with respect to said second portion when said temple element and said second portion are in a substantially fully open condition only about a single axis comprise mutually engageable stepped surfaces of said first and second portions.

12. The combination of claim 1 wherein said support seat is shaped complimentarily to said shaped element.

13. The combination of claim 1 wherein said shaped element comprises a pair of shaped elements provided at opposite ends of a cylindrical portion, and wherein said support seat comprises a pair of support seats each provided at a respective first portion and second portion.

14. In a pair of eyeglasses comprising a first portion and a second portion, a hinge for mutually pivotally connecting the first portion and the second portion, the hinge comprising:

a shaped element with a substantially spherical shape provided at one of said first and second portions; and a support seat provided at the other of said first and second portions;

wherein said shaped element is rotatably supported in said support seat such that, in a free rotation condition between said first and second portions, said first portion is rotatable with respect to said second portion about three rotation axes all passing substantially through a central point of said spherical shaped element; and wherein the combination further comprises means for substantially allowing rotation of said first portion with respect to said second portion when said first and second portions are in a substantially fully open condition only about a single axis so as to rotate the first portion with respect to the second portion about said single axis to move said temple from said fully open condition into said free rotation condition between said first and second portions.

15. The combination of claim 14 wherein said first portion is a temple element and said second portion is a lens front portion.

16. The combination of claim 14 wherein said first portion is a first half lens front portion and said second portion is a second half lens front portion.

* * * * *